United States Patent Office 3,051,739
Patented Aug. 28, 1962

3,051,739
MANUFACTURE OF TRIMETHYL PHOSPHATE
Merle L. Gould, Baton Rouge, La., assignor to Ethyl Corporation, New York, N.Y., a corporation of Delaware
No Drawing. Filed Aug. 20, 1959, Ser. No. 834,961
5 Claims. (Cl. 260—461)

This invention relates to the production of trimethyl phosphate and especially to an improved process for large scale commercial manufacture thereof.

Many alkyl and aryl phosphate esters are presently produced on commercial scale and are extensively used both as additives to gasoline and as plasticizers for thermoplastics. The simplest of the organo phosphate esters, trimethyl phosphate, is not manufactured at the present time even though it has been recognized as being a highly efficient and effective gasoline additive (U.S. 2,427,173) and even though it would be much cheaper than the phosphate esters presently in use. Its economy is based upon its high phosphorus content (22 percent of trimethyl phosphate) whereas with tricresyl phosphate, for example, the phosphorus content is only about 12 percent. The major deterrent in the use of trimethyl phosphate has been the lack of an adequate process to economically produce the same. By all known processes the yields of trimethyl phosphate have been of the order of 20–40 percent. Among the many reasons for poor yields includes the formation of by-product methyl chloride and acids, even at temperatures as low as −70° C.

It is accordingly an object of this invention to provide an improved process for the manufacture of trimethyl phosphate. Still another object is to provide a process which is suitable for use on large commercial scale to give high yields, i.e., above about 85 percent of trimethyl phosphate, and which at the same time avoids the formation of undesired by-products. Another object is to provide a process in which the product can be simply and easily recovered by distillation without the need for neutralization. Still another object is to provide a process which can be integrated with a methyl chloride or ethyl chloride process, thereby permitting the economic and efficient utilization of by-product hydrogen chloride without separation steps.

It has now been found that exceptional yields of trimethyl phosphate can be obtained if a reaction zone is established in which methanol and phosphorus oxychloride are continuously fed to the zone under reaction conditions, the methanol being fed in at least 30 percent excess based on stoichiometry, simultaneously feeding an alkyl chloride selected from the group consisting of methyl chloride and ethyl chloride to said reaction zone, the alkyl chloride being fed in vaper phase near the bottom of the vertical reaction zone to provide countercurrent stripping of the hydrogen chloride, the quantity of gaseous alkyl chloride added being from 2 to 10 moles per mole of hydrogen chloride produced as a by-product, the by-product hydrogen chloride and alkyl chloride vapor being removed from the top of the zone and the product trimethyl phosphate being recovered at the bottom of the reaction zone. In addition to the alkyl chloride vapor, it is preferred to also add a sufficient quantity of alkyl chloride in the liquid phase to remove by vaporization the heat of reaction and the heat of solution of the hydrogen chloride in the reaction mixture. If desired, a reflux condenser can be provided at the top of the reactor to continuously return liquid alkyl chloride to the reactor for this purpose. The phosphorus oxychloride/methanol mole ratio is preferably between about 1:3.9 and 1:8. The residence time in the reaction zone should not be greater than about one hour and preferably the residence time is maintained between 5 minutes and 30 minutes. The temperature of the reaction can range from about 0 to 50° C. although it is preferred to maintain the temperature from 10 to 30° C. The pressure of the reaction is maintained from atmospheric to about 100 p.s.i.g. Higher pressure can be used if desired.

The reaction zone is best separated into stages, usually from 3 to 20 stages, in order to permit high yields of the desired trimethyl phosphate without the formation of other phosphorus-containing by-products. Best results are obtained with from 4 to 10 stages. In some instances, it is desirable to employ a packed reactor using the common packing materials such as Raschig rings and the like. The trimethyl phosphate removed from the bottom of the vertical reaction zone can be distilled directly to recover the trimethyl phosphate in high purity, usually from 95 to 100 percent.

The following are typical examples which illustrate the process of this invention. The examples of Table I were carried out in a vertical column having 5 plates. The methanol phosphorus oxychloride and the liquid methyl chloride were fed on the top plate and the gaseous methyl chloride on the bottom plate. The reaction mixture was maintained at about 20° C. All quantities are given in moles.

TABLE I

| Feed (Moles) | Examples | | | | |
|---|---|---|---|---|---|
| | I | II | III | IV | V |
| $POCl_3$ | 0.2073 | 0.2291 | 0.2401 | 0.2401 | 1.000 |
| $MeOH$ | 1.5250 | 0.8250 | 1.4250 | 1.5750 | 5.000 |
| $MeCl_{liq.}$ | 3.600 | 2.940 | 3.500 | 3.360 | 8.700 |
| $MeCl_{vapor}$ | 5.000 | 4.699 | 4.700 | 4.700 | 6.000 |
| Conver. | 97.7 | 95.8 | 95.2 | 97.2 | 97.0 |
| Percent HCl remvd | 60.6 | 86.4 | 70.0 | 57.0 | 65.0 |
| Temp., ° C | 20 | 20 | 20 | 25 | 20 |
| Residence Time (Minutes) | 18.9 | 28.9 | 18.9 | 20.2 | 25.0 |
| Prod. (Wt. percent): | | | | | |
| HCl | 9.18 | 7.93 | 10.81 | 15.44 | 10.00 |
| MeOH | 19.78 | 6.21 | 11.02 | 29.71 | 15.00 |
| POOH | 3.39 | 5.00 | 3.55 | 4.42 | 3.00 |
| Unreacted $POCl_3$ | | 3.05 | 2.85 | | |
| TMP | 27.99 | 65.22 | 43.29 | 44.98 | 67.00 |
| MeCl | 39.66 | 12.06 | 28.47 | 5.44 | 5.00 |
| TMP Yield | 88.51 | 88.74 | 86.84 | 90.46 | 92.00 |

The above product was thereafter distilled in two successive columns to obtain pure trimethyl phosphate. The first column was operated with an overhead temperature of about 38° F. and a bottoms temperature of 235° F. The overhead was primarily methanol and HCl, with small quantities of methyl chloride. The bottoms were passed to a second column wherein the trimethyl phosphate was distilled at an overhead temperature of 190° F. and a bottoms temperature of 390° F.

*Example VI*

The process of this example is carried out in separate staged stirred pot reactors, excellent results being obtained with three pots in series. The phosphorus oxychloride (1.5 moles per hour) is fed to the first reactor along with 7.5 moles per hour of methanol. The reaction mixture from the first reactor is taken from the bottom of the reactor and fed to the second reactor near the top. Likewise, the reaction mixture of the second reactor is also removed at the bottom thereof and fed to the third reactor near the top thereof. Each of the reactors was maintained at a temperature of 20° C. The residence time in the first reactor is 10 minutes, the second reactor 30 minutes, and the third reactor 25 minutes. To each of the reactors is fed 12 moles per hour of methyl chloride (3 moles as a liquid) gas in order to provide internal cooling and crossflow stripping of the hydrogen chloride formed in the reaction. The mixed methyl chloride and hydrogen chloride gas stream is removed from the top of each of the stirred reactors. The trimethyl phosphate reaction mixture is removed from the third reactor to a distillation column operated at an overhead temperature of 0° C. and bottoms temperature of 110° C., the pressure in the column being about 20 mm. of mercury. The purified trimethyl phosphate is thereafter removed from the bottom of the first column and fractionated in a second column operating at overhead temperature at the boiling point of the trimethyl phosphate; the column also is operated at a reduced pressure, i.e., about 20 mm. of mercury. The acids formed in the reaction are removed as bottoms of the second column. The overhead from the first column is primarily methanol containing dissolved HCl and trace quantities of methyl chloride. This overhead gas mixture is partially condensed and returned to the first reactor. The uncondensed HCl and traced quantities of methanol can be recovered or used in other processes. A good yield of distilled purified trimethyl phosphate is obtained.

A very effective and efficient manner of carrying out the process of this invention is to integrate the step of forming the trimethyl phosphate with a process of manufacturing methyl chloride or ethyl chloride. Thus, the hydrogen chloride formed in the reaction together with the alkyl chloride used in the process can be passed directly to the alkyl chloride plant without pre-separation of the alkyl chloride from the by-product hydrogen chloride. Accordingly, in the above examples, the hydrogen chloride removed from the reactor together with the methyl chloride vapor can be sent directly to a methyl chloride plant (U.S. 1,784,423 and 1,824,951) wherein hydrogen chloride is reacted with methyl alcohol in the presence of a Friedel-Crafts catalyst, such as aluminum or iron chloride. This reaction is carried out preferably at the boiling point of the reaction medium. A part of this methyl chloride can then be returned to the trimethyl phosphate plant for use in the process.

When each of the above examples are repeated using ethyl alcohol instead of methyl alcohol, similar results are obtained. However, in this case, the overhead containing hydrogen chloride and ethyl chloride are preferably passed to a reactor containing aluminum chloride or other Friedel-Crafts catalyst dissolved in ethyl chloride solvent and the hydrogen chloride reacted therein with ethylene (U.S. 2,838,578). This reaction is suitably carried out at elevated temperatures and pressures, that is above about 30° C. and at a pressure over 2 atmospheres. It has been found that the highly desirable range of operating temperatures is between 30° C. and 200° C. and still more preferably between 40 and 80° C. Similarly, under these temperature conditions operating pressures between 2 to 30 atmospheres and preferably between 6 and 14 atmospheres are beneficial in carrying out this process.

We claim:
1. Process for the manufacture of trimethyl phosphate comprising establishing a reaction zone containing from about 3 to 20 stages, continuously feeding methanol, phosphorus oxychloride and an alkyl chloride to said zone, said methanol being fed in at least 30 percent excess based on stoichiometry, said alkyl chloride being selected from the group consisting of methyl chloride and ethyl chloride, a fraction of said alkyl chloride being fed in the liquid phase in quantity sufficient to remove the heat of reaction and heat of solution of said hydrogen chloride in the reaction mixture by vaporization thereof, the major portion of said alkyl chloride being fed in the vapor phase and constituting from 2 to 10 moles per mole of hydrogen chloride produced as a by-product.

2. The process of claim 1 wherein the reaction zone contains from about 4 to about 10 stages.

3. The process of claim 1 wherein the phosphorus oxychloride and methanol are fed into the reaction zone at a ratio of phosphorus oxychloride:methanol of from about 1:3.9 to about 1:8.

4. The process of claim 1 wherein the residence time in the reaction zone is maintained between about 5 minutes and about 30 minutes.

5. The process of claim 1 wherein the temperature of the reaction is maintained from about 10° C. to about 30° C.

References Cited in the file of this patent
UNITED STATES PATENTS
2,624,750   Pechukas _____ Jan. 6, 1953
OTHER REFERENCES
Orloff et al.: J. Am. Chem. Soc. 80, 734–739 (1958).